May 3, 1966 L. L. MEYER 3,249,366
STEERING MECHANISM FOR A TRACTOR

Filed Sept. 8, 1964 2 Sheets-Sheet 1

INVENTOR.
LESTER L. MEYER
BY
HIS ATTORNEYS

May 3, 1966 L. L. MEYER 3,249,366
STEERING MECHANISM FOR A TRACTOR
Filed Sept. 8, 1964 2 Sheets-Sheet 2
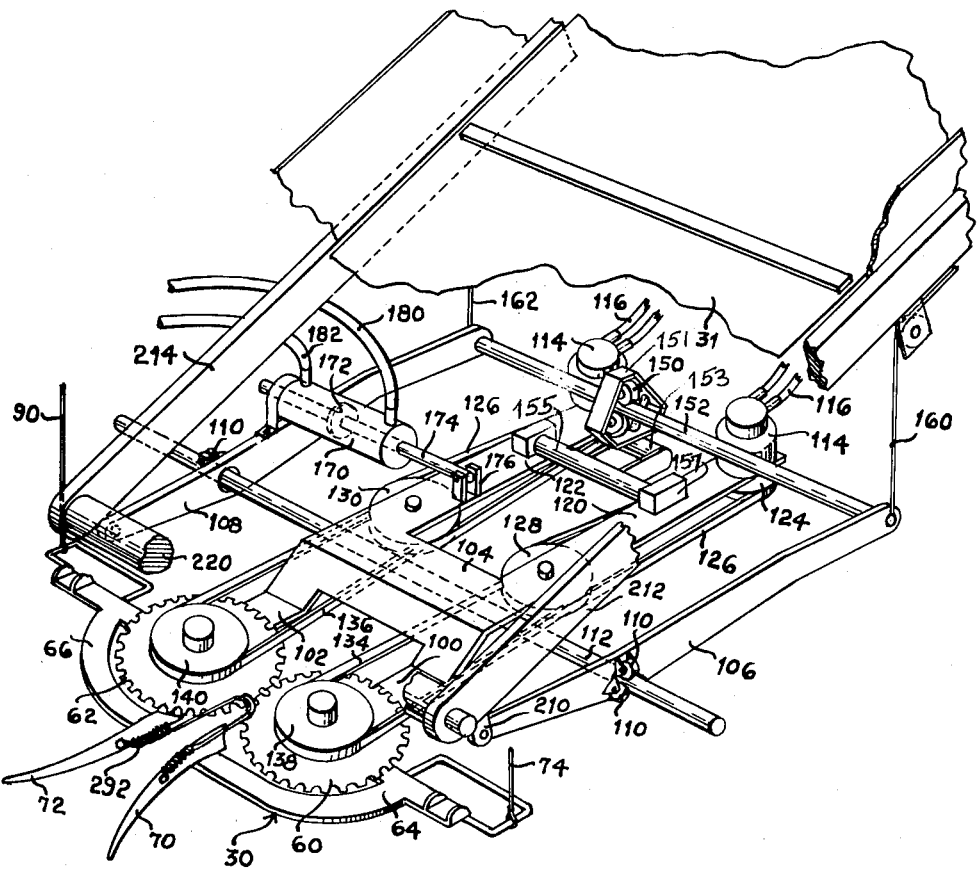
FIG 3
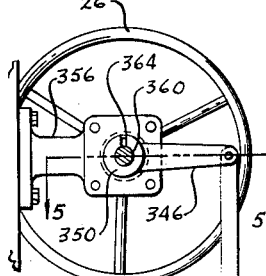
FIG. 4
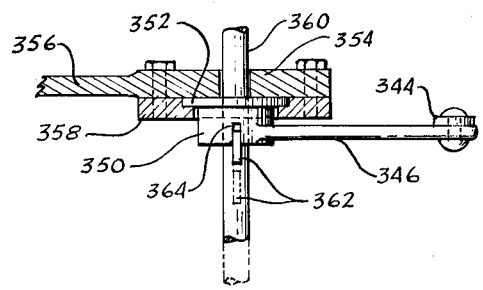
FIG. 5
INVENTOR.
LESTER L. MEYER
BY 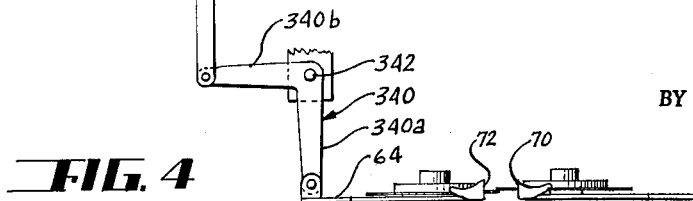
HIS ATTORNEYS

United States Patent Office 3,249,366
Patented May 3, 1966

3,249,366
STEERING MECHANISM FOR A TRACTOR
Lester L. Meyer, 120 W. George St., Arcanum, Ohio
Filed Sept. 8, 1964, Ser. No. 394,860
3 Claims. (Cl. 280—87)

The disclosure in this application is a continuation-in-part of my application for United States Letters Patent, Serial No. 129,268, filed August 4, 1961, now United States Letters Patent, No. 3,178,873, granted April 20, 1965.

This invention relates to a steering mechanism for a tractor connected to a machine for use with row crops, such as tobacco plants, corn, sugar beets, cabbage, et cetera, which are planted in parallel rows, although this invention is not necessarily so limited.

An object of this invention is to provide guard members used in shifting the operating mechanism to follow the row and, at the same time, to steer the tractor used in propelling the machine, so that the steered tractor automatically follows the row of vegetation.

Other objects and advantages reside in the construction of parts, the combination thereof, the method of manufacture and the mode of operation, as will become more apparent from the following description.

In the drawings, FIGURE 1 is a top plan view with some parts broken away or omitted of one embodiment of the row operating machine that has been mounted upon the side of a tractor.

FIGURE 3 is a perspective view of the row crop operating machine and the driving mechanism therefor, with parts broken away and some parts shown in section.

FIGURE 4 is a fragmentary view of a modified form of steering mechanism.

FIGURE 5 is a fragmentary view of a portion of the steering mechanism shown in FIGURE 4 releasably attached to a steering rod of a tractor, with parts shown in section.

Figure 1:
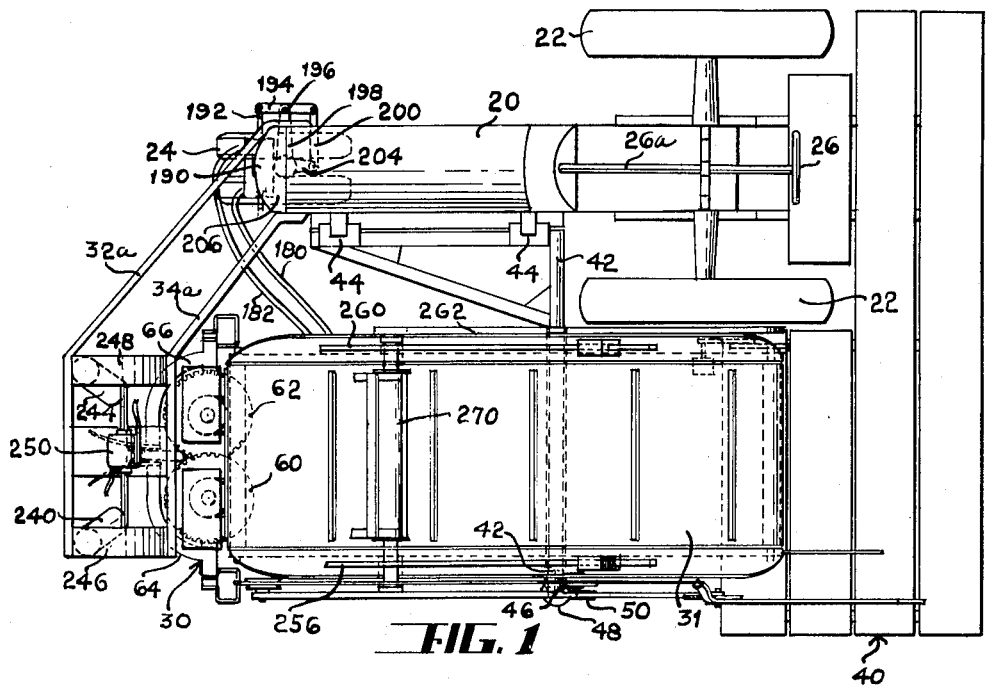

Referring to the drawings, the reference character 20 indicates a frame of a tractor having drive wheels 22 and either one or two steering wheels 24. This tractor may be steered manually by a steering wheel 26 or automatically by a steering mechanism that will be described more fully later.

For the purpose of illustration, a tobacco cutter has been shown. Instead of a tobacco cutter, any suitable row crop cultivator, cutter or harvesting machine may be used.

Mounted on the side of the tractor is a tobacco cutter assembly 30 and conveyor or elevator 31. A pivotally mounted supporting frame structure 42 is pivoted at 44 to the side of the tractor frame and extends transversely of the cutter assembly 30 and conveyor 31 and terminates at 46, where it is connected to a tubular member 48 supporting a ground wheel 50. The wheel 50 and the member 48 raise and lower the outer portion of the frame of the cutter assembly 30 and conveyor 31, to accommodate variations in the ground level. The entire frame structure for the conveyor is pivotally mounted upon the member 42.

Tobacco cutter mechanism

The tobacco cutter mechanism includes a pair of rotary discs or cutters 60 and 62. The margins of these wheels are serrated or toothed, so as to effectively cut the stems of the tobacco plants. Incidentally, the stems of the tobacco plants may be quite heavy, 1½" or 2" in diameter, more or less. These cutters 60 and 62 are mounted upon frame members 64 and 66. Each of the frame members 64 and 66 has attached thereto horn-like steering or guard members 70 and 72. These horn-like steering members 70 and 72 are used in guiding the cutters, the horn-like members engaging the stems of the plants to be cut and if a plant is offset from the row or the row is crooked, these horn-like members 70 and 72 align the cutters which are floatingly suspended, which mechanism will now be described.

By referring to FIGURE 3, it can readily be seen that the frame member 64 is suspended from a rod 74 attached to a spring 76 connected by a cable 78 trained over a pulley 80. The pulley 80 is rotatably mounted upon member 81 non-rotatably mounted upon the end of member 42. A lever 86 is rotatably mounted upon member 87 also non-rotatably mounted upon the end of member 42. The end of the cable 78 is attached to a member 84 that may be raised or lowered by the lever 86 provided with a suitable pawl (not shown) engaging the ratchet 88 fixedly mounted upon member 87. The frame member 66 is likewise suspended upon a rod or cable 90 connected to a spring (not shown), the tension of the springs being such that upon the proper adjustment of the lever 86 and the cables 78 and 90, any slight irregularity in the ground will cause the cutters to be raised and lowered, whereby the frame glides over the ground. In other words, the cutters are mounted upon a frame that practically floats.

The frame members 64 and 66 may be integral with or fixedly attached to the arms 100 and 102 of frame member 104 that is supported for transverse movement upon the pair of frame members 106 and 108 by a shaft 112. A plurality of rollers 110 provide supports for the ends of the shaft 112, so that this shaft, together with the frame member 104 and the cutters 60 and 62, may freely move transversely with respect to the frame members 106 and 108.

A pair of hydraulic motors 114 are mounted upon a second set of arms 120 and 122 integral with frame member 104. The motors are connected by suitable conduits 116 to the hydraulic system of the tractor. A hydraulic pump and hydraulic fluid is now built in and forms a part of the tractor. These motors 114 are provided with pulleys 124, only one of which has been shown, over which belts 126 are trained, driving pulleys 128 and 130 integral with or fixedly attached to a second set of pulleys driving the belts 134 and 136 used in driving pulleys 138 and 140. The pulley 138 is fixedly attached to the cutter 60 and the pulley 140 is fixedly attached to the cutter 62, so as to drive the two cutters substantially in unison. Rollers 150 are mounted in a frame 151 supported upon a cross bar 153 having the ends fixedly attached to a second cross bar 155 permanently attached to blocks 157, one of which is fixedly attached to the arm 120 and the other attached to the arm 122. The rollers 150 are shown to be engaged with the rod 152 which is secured to frame members 106 and 108. The rear ends of the frame members 106 and 108 are supported upon a pair of cables 160 and 162 that are connected to a lever 166 and a duplicate on the opposite side, not shown, for adjusting the angle or the tilt of the cutters and the parts supported thereby. The lever 166 is provided with a ratchet engaging a pawl mechanism, not shown, that holds the lever 166 in adjusted position.

Automatic steering mechanism

As stated before, the tractor may be steered manually by the steering wheel 26 connected to a steering rod 26a. However, when cutting tobacco, it is preferable that the tractor and the cutter mechanism cooperate to steer the tractor along the row that is being cut. This has been accomplished by the use of a cylinder 170 provided with a piston 172 connected to a piston rod 174 having the end attached to a pair of brackets 176 mounted on the arm 122. This cylinder is connected to fluid conduits 180 and 182. These fluid conduits 180 and 182 are connected to the ends of a larger cylinder 190 provided with a piston that actuates the piston rod 192 connected to a lever 194 pivoted at 196 to a stationary arm 198. The opposite end of the lever 194 is pivotally attached to a link 200 connected to an arm 204 connected to the post 206 supporting the steering wheels. It can be readily seen that as the piston rod 192 is actuated by the fluid in the hydraulic system, the steering wheels are then steered either to the right or to the left, depending entirely upon the position of the frame supporting the cutters with respect to the frame members 106 and 108. It is to be noted that the frame members 106 and 108 are connected by links 210 to a pair of frame members 212 and 214. Only one of the links has been shown. By using a cylinder 170 that is smaller than the cylinder 190, the movement imparted to the piston rod 192 will be less than the movement imparted to the piston rod 174. The steering mechanism is such that the tractor gradually moves to align the guard members 70 and 72 with respect to the frame 42.

The frame members 212 and 214 support a roller 220 at the lower end thereof and a roller 222 at the upper or rear end. A canvas conveyor is supported upon the rollers 220 and 222, the roller 222 being driven by a belt 224 and a second belt 226 connected to a shaft 228 driven from the axle of the tractor.

Reel mechanism

Figure 2:
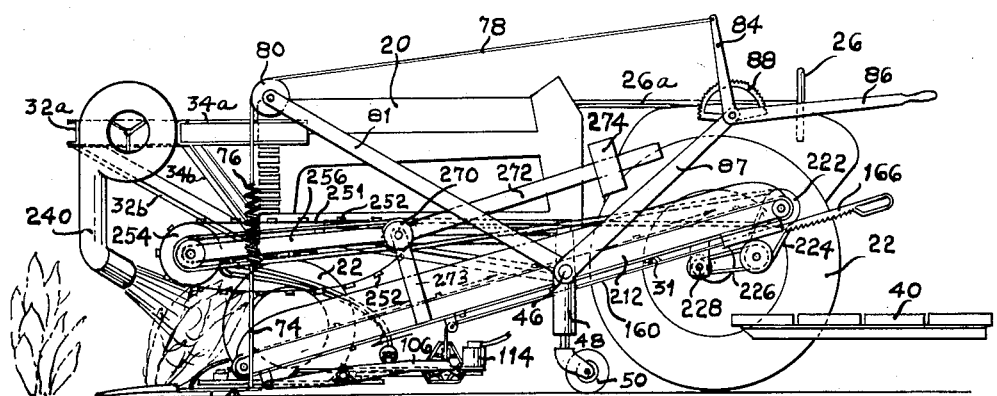
FIGURE 2 is a side elevational view of the cutter, the elevator and the reel.

The tobacco plants are subjected to two blasts of air supplied from conduits 240 and 244 from blowers 246 and 248 that may be driven by a motor 250 which may be either an electric motor or a hydraulic motor. In addition to the blasts of air from the conduits 240 and 244, a floating reel device is used. This floating reel device is so balanced that the reel per se droops downwardly until the lower portion of the reel contacts a tobacco plant which is easily lifted upwardly by a small force. This reel device includes a pair of belts 251, as clearly shown in FIGURE 2, having slats 252 attached to the belts and extending at right angles to the belts to span the distance between the belts. The belts, as clearly shown in FIGURE 2, are trained over the drums 254 and 270, each pivotally attached to the arms 256. These arms are pivotally attached to vertical arms 273, only one of which is shown. The arms 273 are permanently attached at their lower ends to the frame members 212 and 214. The belts are quite loose, so as to provide a considerable slack. The floating reel assembly, including the belts and slats, engage the top portion of the tobacco plants, automatically raising or lowering, to accommodate the changes in the height of the tobacco plants throughout the field.

The forward ends of the belts pass over a drum or roller 254 which is pivotally mounted in link members 256 and 260 near the end thereof. This drum or roller 254 is driven by a belt 262 passing over a pulley (not shown) driven by the tractor. The rear ends of the belts are mounted upon an idler or roller 270 located near the pivot of the link members. The link members 256 and 260 are attached to a counter balance arm 272 provided with a weight 274 that is adjustably mounted upon the arm 272, so that the forward ends of the belts are mounted on a floating support and the weight 274 is so adjusted that a slight force exerted upon the slats 252 will raise or lower the forward ends of the belts. Thus, if the tobacco is high, the front end of the belts will be raised, so as to barely touch the tobacco. These belts cooperate with the blasts of air to lay the tobacco plants down on the canvas conveyor or rubber belt conveyor in an orderly manner.

In the modification disclosed in FIGURES 4 and 5, a mechanical link mechanism is connected to the frame 64 for supporting the cutters, which frame floats and is guided along the row so that any transverse or sidewise movement of the guards or horns 70 or 72 will be transmitted to the steering mechanism of the tractor. This mechanical link mechanism includes a bell crank member 340 pivotally connected at 342 to the tractor frame. The downwardly projecting arm 340a of the bell crank member 340 is connected to the frame 64 and the horizontally disposed arm 340b of the bell crank member 340 is pivotally connected to a link 344 having its upper end connected to an arm 346 rigidly connected to a sleeve 350. This sleeve 350 is rotatably mounted on the steering rod 360. The sleeve 350 is provided with a flange 352 seated in an annular cavity in member 354 fixedly attached to the tractor by an arm 356. The annular flange of the sleeve 352 is held in this cavity by a capping member 358 secured by suitable bolts, as clearly shown. The steering rod 360 is provided with a key 362 normally seated in a notch 364 in the sleeve 350. When the key 362 is seated in the notch 364, the tractor is then steered by any transverse movement of the frame 64.

It can readily be seen that if the frame 64 is moved to the left, as viewed in FIGURE 4, the bell crank member 340 will then rotate a short distance in a clockwise direction about the pivot 342, thereby actuating the arm 346 in a counterclockwise direction, as viewed in the same figure, so as to rotate the steering rod 360 in a counterclockwise direction, as viewed in the same figure. On the other hand, if the frame 64 is actuated to the left, as viewed in FIGURE 4, the bell crank member 340 will move in a counterclockwise direction, thereby rotating member 346 in a clockwise direction. As a rule, the movements of the frame 64 to the right or to the left are only slight movements and, that being the case, the steering rod 360 will be rotated through rather small angles. By selecting the proper lengths of the various links and arms, the tractor will follow the row of the crop to be cut, cultivated or otherwise treated.

Whenever it is desirable to steer the tractor manually, it is merely necessary to pull the steering rod 360, so as to unseat the key 362 out of the notch 364. The steering rod 360 may then be manually manipulated, so as to steer the tractor. For example, at the end of a row or in the event there is a void area in the row, it may be necessary to manually steer the tractor until the horns 70 and 72 again straddle a row of vegetation. At that time, it is merely necessary to actuate the steering rod 360 so as to seat the key 362 in the notch 364, so that the automatic steering mechanism may again take control of the tractor.

Mode of operation

In starting the cutting operation, the tractor is driven to a position such that the cutters and the horn-like members 70 and 72 are aligned with the row of tobacco. Up to this time the tractor has been manually steered by the use of the steering wheel. As the cutter proceeds along the row, the tobacco is cut and laid down on the conveyor to be elevated towards the rear of the machine.

The horn-like guide members 70 and 72 guide the cutters so that in the event the row is crooked or in the event a plant is slightly out of line, the cutters will be guided so as to cut the plant. At the same time, the movement of the frame supporting the cutters to the right or to the left will steer the tractor to the right or to the left. However, the steering mechanism is so designed that the tractor is steered gradually to change the direction of a row. This has been done so as to prevent hunting of the steering mechanism, that is, to prevent the steering wheel from swerving too far to the right or to the left. In actual use of the cutter, it has been found that it is absolutely unnecessary to use the manual steering device from one end of the row to the other end of the row. When it comes to the end of the row, the cutters are usually raised by means of the cable 78 and the lever 86, as best seen in FIGURE 2, and one of the operators takes hold of the steering wheel to turn the tractor and the cutter to align the same with a succeeding row. When the tractor is aligned with the succeeding row, the cutters are lowered and the operation continues.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A machine for use with row crops, said machine being mounted on a tractor having steering mechanism, said machine including a first frame mounted on the tractor, a second frame suspended for lateral movement with respect to the tractor, means contacting a row crop for moving said second frame laterally, hydraulic means responsive to the lateral movement of the second frame steering the steering mechanism in response to said lateral movement, said hydraulic means includes a piston rod member and a cylinder member, one of said members being attached to the first frame, and the other member attached to the second frame, a second cylinder member and a second piston rod member, one of said second members being mounted on the tractor and the other second member being connected to the steering mechanism and hydraulic conductors connecting both ends of the cylinders together so that the steering mechanism is activated in response to lateral movement of the second frame.

2. A machine for use with row crops, said machine being mounted upon a tractor having steering mechanism, said machine comprising a first frame mounted on the tractor, a second frame suspended from the first frame for lateral movement, said second frame having a position aligned with the first frame, means responsive to the row crop for aligning the second frame with the row so as to move the second frame laterally off-center with respect to the first frame, and means responsive to off-center position of the second frame for steering the tractor to align the first and second frames, said last mentioned means including a cylinder mounted on the first frame member, a piston rod member for said cylinder attached to the second frame member, a second cylinder member fixedly attached to the tractor and a second piston rod for said second cylinder connected to the steering mechanism, and hydraulic conductors connecting the cylinders together at both ends so that the steering mechanism is actuated in response to the lateral movement of the second frame member.

3. A machine for use with a row of vegetation, the combination of a tractor having a steering mechanism with a frame straddling the row, means for suspending the frame for lateral movement with respect to the tractor, said frame including vegetation engaging means for moving the frame into alignment with the row, and means responsive to the lateral movement of the frame for steering the tractor along the row, said responsive means including a cylinder fixedly mounted with respect to the tractor, a piston rod for said cylinder attached to the frame straddling the row, a second cylinder fixedly mounted on the tractor, a piston rod for said second cylinder attached to the steering mechanism of the tractor, fluid conductors for connecting both ends of the cylinders together so that lateral movement of said frame actuates the steering mechanism of the tractor so as to steer the tractor along the row.

References Cited by the Examiner

UNITED STATES PATENTS

| | | | |
|---|---|---|---|
| 2,329,596 | 9/1943 | Dalimata | 56—219 |
| 2,454,063 | 11/1948 | Irvine | 56—219 |
| 2,496,727 | 2/1950 | Jenkins | 180—82 X |
| 2,509,914 | 6/1950 | Goodwine | 180—79.1 |
| 2,818,275 | 12/1957 | Hollowell | 280—81.5 X |
| 2,981,355 | 4/1961 | Rabuse | 180—79.1 |
| 2,993,548 | 7/1961 | Kiel | 180—79.2 X |
| 3,038,544 | 6/1962 | Richey et al. | 172—5 |

FOREIGN PATENTS 1,204,403   3/1958   France.

OTHER REFERENCES

Liljedahl and Strait Automatic Tractor Steering, article in Agricultural Engineering Magazine, June 1962, pages 332–335.

KENNETH H. BETTS, *Primary Examiner.*

RUSSELL R. KINSEY, BENJAMIN HERSH,
*Examiners.*

R. C. PODWIL, *Assistant Examiner.*